United States Patent
Ceccom

(10) Patent No.: US 9,753,969 B2
(45) Date of Patent: Sep. 5, 2017

(54) SYSTEMS AND METHOD FOR WIRELESSLY AND SECURELY UPDATING A TERRAIN AWARENESS WARNING SYSTEM DATABASE

(71) Applicant: HONEYWELL INTERNATIONAL INC., Morristown, NJ (US)

(72) Inventor: Christophe Ceccom, Midi Pyrénées (FR)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 266 days.

(21) Appl. No.: 14/559,342

(22) Filed: Dec. 3, 2014

(65) Prior Publication Data

US 2016/0335309 A1    Nov. 17, 2016

(51) Int. Cl.

| | |
|---|---|
| G01C 23/00 | (2006.01) |
| G06F 17/30 | (2006.01) |
| G08G 5/00 | (2006.01) |
| H04B 1/40 | (2015.01) |
| H04B 7/185 | (2006.01) |
| H04L 29/08 | (2006.01) |

(52) U.S. Cl.
CPC ..... *G06F 17/30377* (2013.01); *G08G 5/0013* (2013.01); *G08G 5/0021* (2013.01); *G08G 5/0086* (2013.01); *G08G 5/0091* (2013.01); *H04B 1/40* (2013.01); *H04B 7/18506* (2013.01); *H04L 67/12* (2013.01); *G08G 5/0052* (2013.01)

(58) Field of Classification Search
CPC .... G08G 5/0025; G08G 5/0013; G08G 5/025; G07C 5/008; G07C 5/0841

USPC ................. 701/1, 3, 4, 14, 16; 340/961, 977
See application file for complete search history.

(56) References Cited

U.S. PATENT DOCUMENTS

| | | |
|---|---|---|
| 6,438,468 B1 | 8/2002 | Muxlow et al. |
| 7,257,469 B1 | 8/2007 | Pemble |
| 8,423,009 B2 | 4/2013 | Srinivasan et al. |
| 2010/0121938 A1 | 5/2010 | Saugnac |
| 2012/0001773 A1 | 1/2012 | Lyons et al. |
| 2013/0297103 A1* | 11/2013 | Baker ................. G08G 5/0013 701/14 |

(Continued)

FOREIGN PATENT DOCUMENTS

| | | |
|---|---|---|
| EP | 2012091 A1 | 1/2009 |
| GB | 2176035 A | 12/1986 |
| WO | 2014115139 A1 | 7/2014 |

OTHER PUBLICATIONS

Extended EP Search Report for Application No. 15196868.2-1803 dated Mar. 5, 2016.

(Continued)

*Primary Examiner* — Gertrude Arthur Jeanglaude
(74) *Attorney, Agent, or Firm* — Lorenz & Kopf, LLP

(57) ABSTRACT

Systems and methods for updating a terrain awareness and warning system (TAWS) database are disclosed. The systems request, by way of the first wireless communications device communicating by way of an avionics data transfer protocol, an update to the TAWS database, where the request is based upon flight path data, and receive and accept, by way of the first wireless communications device and by way of the avionics data transfer protocol and in response to the request, the update to the TAWS database.

14 Claims, 2 Drawing Sheets

(56) References Cited

U.S. PATENT DOCUMENTS

2013/0325215 A1 12/2013 Vos et al.
2014/0062729 A1 3/2014 Conner et al.

OTHER PUBLICATIONS

Sindlinger, A. et al.; Automated NOTAM Processing for a Graphical and Textual Integration on Data Link Equipped Aircraft; ©2010 IEEE; 2010 Integrated Communications Navigation and Surveillance (ICNS) Conference May 11-13, 2010.

* cited by examiner

SYSTEMS AND METHOD FOR WIRELESSLY AND SECURELY UPDATING A TERRAIN AWARENESS WARNING SYSTEM DATABASE

TECHNICAL FIELD

The present invention generally relates to terrain awareness and warning systems, and more particularly to terrain awareness and warning systems that are updated securely, wirelessly, and in real time.

BACKGROUND

Aircraft typically include terrain awareness and warning systems, or "TAWS." These systems often include a database (a "TAWS database") comprising a variety of terrain and/or other obstacle data ("TAWS data"). For instance, many TAWS include runway data, taxiway data, terrain feature (e.g., elevation) data, weather data, and the like.

As terrain and other obstacle conditions may change, TAWS databases are often updated via a wired connection (e.g., a universal serial bus or USB) connection while an aircraft is on the ground. For example, a TAWS database may be updated while an aircraft is on the ground by an individual equipped with a small database updating tool, such as an electronic flight bag that includes any updated TAWS data that may be relevant for the upcoming flight.

Typically, an aircraft database update is a time constraining activity and is therefore constraining to airlines to schedule it in order not to disrupt daily flight operations. In addition, although TAWS data may be current at the beginning of a flight, as conditions may change during the course of any particular flight, TAWS data that is current at the outset of a flight may, in fact, be outdated or incorrect at the conclusion of the flight.

Hence, there is a need for a TAWS that can be securely, frequently, and easily updated during the course of a flight. There is, in addition, a need for a TAWS that can be updated wirelessly, so that flights are not delayed on the ground as they wait for updated TAWS data to arrive.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a system for updating a terrain awareness and warning system (TAWS) database is disclosed. The system (a) requests, by way of the first wireless communications device communicating by way of an avionics data transfer protocol, an update to the TAWS database, the request based upon flight path data, and (b) receives and accepts, by way of the first wireless communications device and by way of the avionics data transfer protocol and in response to the request, the update to the TAWS database.

Further, in various embodiments, a method for updating a terrain awareness and warning system (TAWS) database is disclosed. The method may comprise, in various embodiments, wirelessly requesting, by way of a first wireless communications device communicating by way of an avionics data transfer protocol, an update to the TAWS database, the request based upon flight path data, and wirelessly receiving and accepting, by way of the first wireless communications device and by way of the avionics data transfer protocol and in response to the requesting, the update to the TAWS database.

Furthermore, other desirable features and characteristics of the systems and methods described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
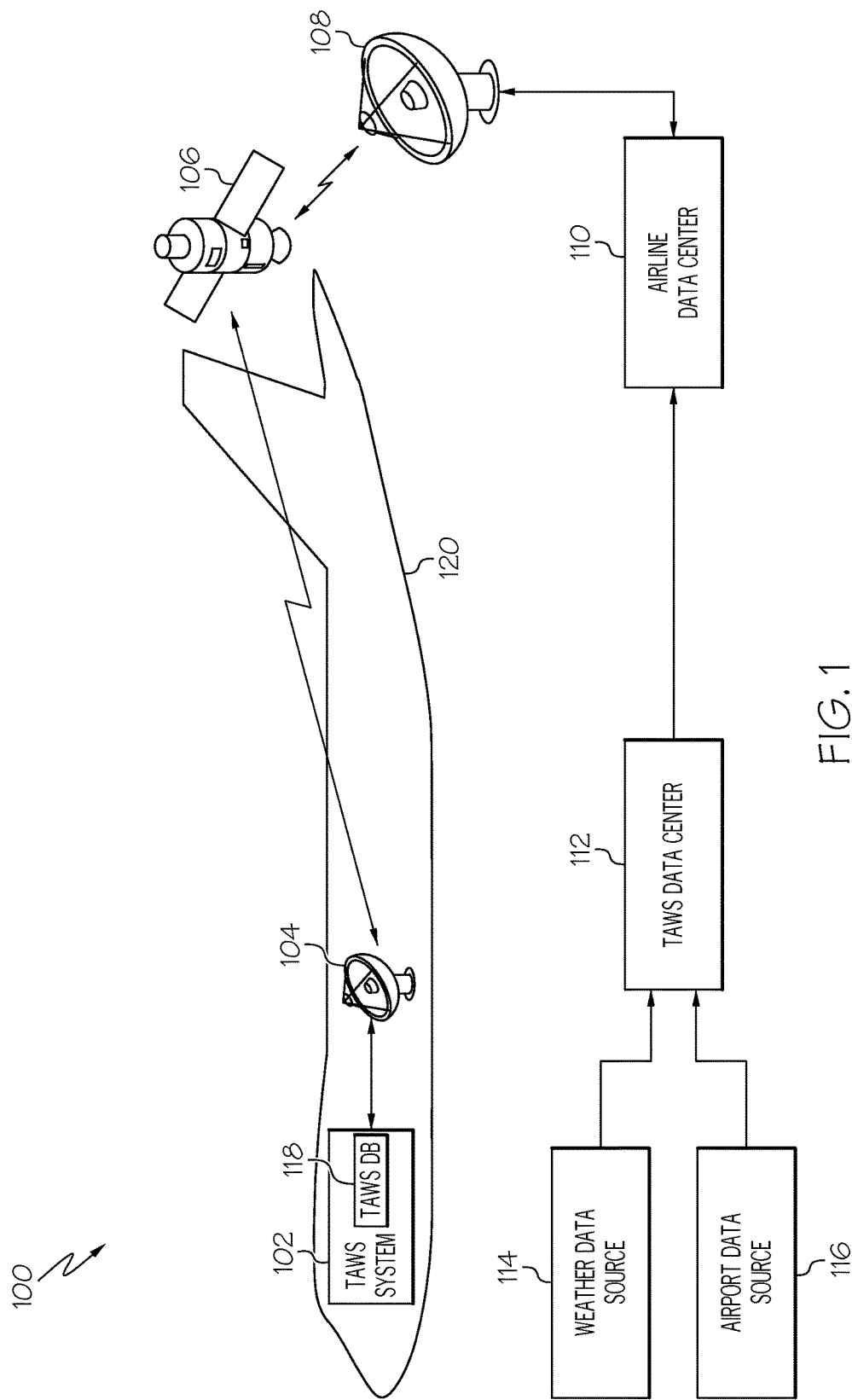
FIG. 1 illustrates, in accordance with various embodiments, a system for wirelessly updating a TAWS database.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system is disclosed that wirelessly updates a TAWS database without any need of a physical or wired connection, prior to a particular flight, of the TAWS database to a TAWS updating tool. Rather, the system includes a first wireless communications device (such as a satellite transceiver or data link) that is communicatively coupled to the TAWS. The wireless communications device transmits a request, made by the TAWS, to a second wireless communications device, such as a satellite transceiver or data link orbiting the Earth (e.g., a satellite transceiver or data link coupled to a satellite). The request made by the TAWS is, in various embodiments, a request to update the TAWS database, and this request is made at any time, including while the aircraft is on the ground or during flight. In various embodiments, for example, the TAWS update request may occur when the TAWS receives destination airport information from an onboard flight management system.

The second wireless communications device can communicates the request made by the TAWS to a third wireless communications device (such as a third satellite transceiver or data link) that is communicatively coupled to a first (optional) datacenter (e.g., a proprietary airline datacenter) that communicates the request made by the TAWS over a network to a second datacenter (e.g., a proprietary TAWS datacenter). In various embodiments, the first datacenter is hosted by an airline in the event that the airline wishes to maintain its own wireless communications with its aircraft. However, in various embodiments, the third wireless communications device simply communicates the request made by the TAWS to the second or TAWS datacenter.

The TAWS datacenter communicates with a variety of data sources to obtain any of a variety of useful TAWS data. For example, the TAWS datacenter communicates with a weather data service provider to obtain weather data and/or an airport data service provider to obtain airport data (e.g., runway data, taxiway data, and the like). Moreover, this datacenter may be linked to one or more airport obstacle and/or building data service providers in conjunction with a variety of, e.g., proprietary, preprocessed obstacle data.

The TAWS datacenter communicates the obtained data over a wireless communications link with the TAWS system aboard the aircraft to the TAWS system aboard the aircraft. There, the TAWS system updates its TAWS obstacle database. This process occurs in real time and, in various embodiments, at the request of the TAWS system as many times as desired prior to, during, and at the conclusion of a flight.

Accordingly, and with reference to FIG. 1, a system 100 for updating a TAWS database is disclosed. The system 100 comprises a TAWS system 102, a first or aircraft wireless communications device 104, a second or satellite wireless communications device 106, and third or TAWS update wireless communications device 108, a first or airline datacenter 110, a second or TAWS datacenter 112, and one or more data sources, such as a weather data source 114 and an airport data source 116. The TAWS system includes a TAWS database 118. The TAWS system 102 and the aircraft wireless communications device 104 can be disposed within an aircraft 120.

In various embodiments, the TAWS system 102 is communicatively coupled (e.g., by way of a network connection, such as an ETHERNET, LAN, WAN, and the like connection) to the aircraft wireless communications device 104. Likewise, the aircraft wireless communications device 104 is, in various embodiments, communicatively coupled (e.g., by way of a wireless connection to the satellite wireless communications device 106. Similarly, in various embodiments, the aircraft wireless communications device 104 can be communicatively coupled (directly and/or indirectly) to a variety of other ground-based wireless communications devices, such as a VHF data link or "VDL" device, a high frequency or "HF"" device, and/or a GATELINK device (as commonly known in the art), each of which may be communicatively coupled to the TAWS datacenter 112. Thus, a variety of communications protocols and/or devices may be implemented to accommodate wireless communications between the TAWS system 102 and the TAWS datacenter 112.

The satellite wireless communications device 106 is, in turn and in various embodiments, communicatively coupled to the TAWS update wireless communications device 108 by way of a satellite communications link, a VHF ("very high frequency") link, an HF ("high frequency") link, and/or via one or more a service providers, such as ARINC ("Aeronautical Instruments, Inc."), SITA, and/or INMARSAT (including an INMARSAT data link). The TAWS update wireless communications device 108 is further, in various embodiments, communicatively coupled (e.g., by way of a network connection, such as an ETHERNET, LAN, WAN, and the like connection connection) to the airline datacenter 110 and/or the TAWS datacenter 112, depending upon the specific network configuration, as described above. The TAWS datacenter 112 is, in various embodiments, communicatively coupled (e.g., by way of a network connection, such as an ETHERNET, LAN, WAN, and the like) to one or more data sources, such as the weather data source 114 and/or the airport data source 116.

Figure 2:
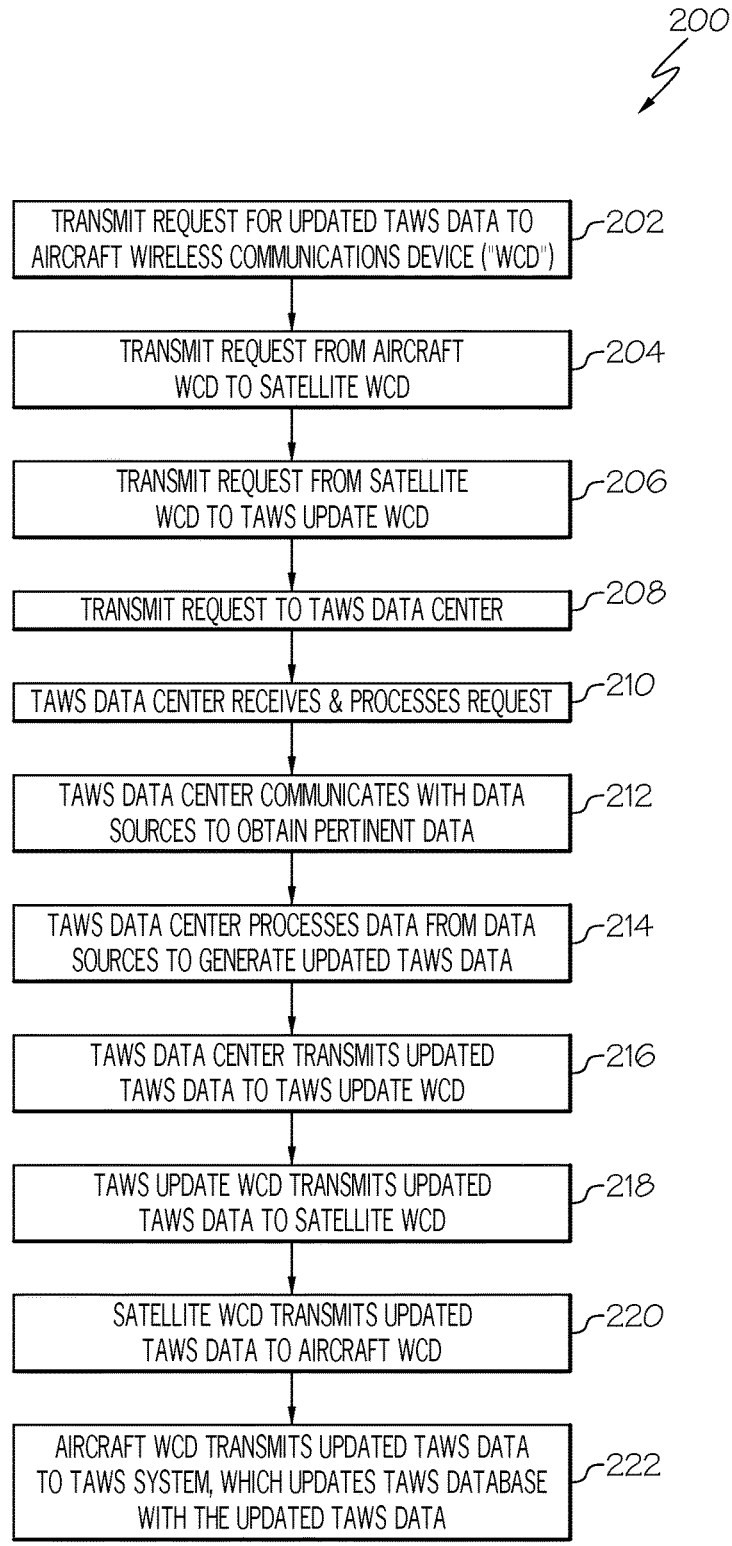
FIG. 2 illustrates, in accordance with various embodiments, a method for wirelessly updating a TAWS database.

With reference to FIG. 2, a process 200 for wirelessly updating a TAWS database is disclosed. In operation, the TAWS system 102 can communicate a request for updated TAWS data to the aircraft wireless communications device 104 (step 202). The aircraft wireless communications device 104, in turn, wirelessly communicates (e.g., via a satellite data link, a WIFI connection, and the like and as described herein) the request to the satellite wireless communications device 106 (step 204), which, in turn, communicates the request to the (e.g., ground based) TAWS update wireless communications device 108 (step 206). The TAWS update wireless communications device 108 communicates the request to the airline datacenter 110 or, as described herein, the TAWS datacenter 112 via one or more network connections (step 208). The TAWS system 102 can communicate a request for updated TAWS data at any time, including during a flight of an aircraft and/or while the aircraft is on the ground.

In either case, the TAWS datacenter 112 receives and processes, in various embodiments, the request (step 210). In particular, the TAWS datacenter 112 communicates with one or more data sources, such as, for example, a weather data source 114 and/or an airport data source 116 to obtain any of a variety of pertinent data, such as, weather data, airport runway and/or taxiway data, data about obstacles or buildings located within an airport, and the like (step 212).

The TAWS datacenter 112, in addition and in various embodiments, processes the data received from the one or more data sources 114 and/or 116 to generate updated TAWS data (step 214). The updated TAWS data may reflect the most up to date weather and/or any other airport data (e.g., runway, taxiway, building configuration). The TAWS datacenter 112 further communicates the updated TAWS data to the TAWS update wireless communications device 108 (step 216). As described herein, the updated TAWS data is communicated over a network to the TAWS update wireless communications device 108, and the updated TAWS data may, in various embodiments, pass through and/or receive additional processing by the airline datacenter 110.

In various embodiments, and with further regard to the airline datacenter 110, the airline datacenter 110 may preload airport related obstacle data from a proprietary datacenter; such as feature may enable the airline datacenter 110 to become the primary interface to the TAWS datacenter 112 and, thus, a the primary interface between an airline and its own aircraft. In addition, the airline datacenter 112 may record one or more update requests generated by one or more TAWS systems 102 operating aboard one or more aircraft to ensure that each TAWS system 102 is up to date for internal safety purposes. Further still, the airline datacenter 110 may maintain the link with a TAWS database 102 in the instance, for example, that the TAWS datacenter 112 utilizes a ground secured network that is not the ground secured network connecting the TAWS datacenter 112 to the airline datacenter 110.

The TAWS update wireless communications device 108 communicates, e.g., via a satellite (or VDL) communications link and as described herein, the updated TAWS data to the satellite wireless communications device 106 (step 218). The satellite wireless communications device 106, in turn, communicates the updated TAWS data to the aircraft wireless communications device 104 (step 220), and the aircraft wireless communications device 104 communicates the updated TAWS data to the TAWS system 102, which updates its TAWS database 118 with the updated TAWS data (step 222).

Thus, in various embodiments, the TAWS system 102 initiates a request in real time and at any time (e.g., during a flight, on the ground) for updated TAWS data. The updated TAWS data can be delivered wirelessly, eliminating the delay that frequently occurs with the necessity of waiting for wired TAWS updates (as described above).

In addition, because the TAWS system 102 initiates the request for updated TAWS data, the security of TAWS updates is preserved, in that any TAWS data received absent a request for updated TAWS data can be rejected or blocked by the TAWS system 102 as hacked, spoofed, or otherwise invalid TAWS data. Moreover, in various embodiments, where the TAWS system 102 has not made a request for updated TAWS data, the TAWS system closes the communication port between itself and the satellite communications device 106. However, in various embodiments, a TAWS system 102 can accept updated TAWS data even in the absence of a request for updated TAWS data (e.g., a TAWS datacenter 112 or airline datacenter 110 can push updated TAWS data to one or more aircraft based upon, for example, changing conditions like incoming weather, shifting airport runway and/or taxiway configurations, aircraft flight path updates, etc.)

In addition, in various embodiments, a pilot may initiate a request (e.g., through a flight management system communicatively coupled to the TAWS system 102) for updated TAWS data. Further still, in various embodiments, a TAWS system 102 may initiate a request for updated TAWS data based upon a variety of conditions or phases, such as, for example, a take-off condition of the aircraft 120, a landing condition of the aircraft 120, and/or periodically and/or intermittently during the flight of the aircraft 120. The TAWS system 102 may further, in various embodiments, request updated TAWS data based upon a flight path of the aircraft 120, which is received from any aircraft system or subsystem (e.g., the flight management system) and/or input by a pilot.

Moreover, the security of updates to the TAWS system 102 database 118 are ensured, because communications occurs between the TAWS datacenter 112 and the TAWS system 102 by way of an avionics protocol, such as an Aeronautical Instruments, Inc. ("ARINC") standard (e.g., an ARINC 615A standard). The communications network used to transmit updated TAWS data to the TAWS system 102 is therefore separate from and operates utilizing a different protocol from any other wireless network operating on the aircraft, such as a WIFI network provided by the airline within the aircraft for the use of passengers. Updated TAWS data also comprises a very small amount of data (e.g., kilobytes); thus, it is possible to communicate the updated TAWS data from the TAWS datacenter 112 to the TAWS system 102 very quickly (e.g., within milliseconds). Any attempt to spoof or hack incorrect TAWS updates is therefore further reduced, as the time it would take to attempt to hack into the TAWS system 102 using an avionics protocol in response to a request by the TAWS system 102 for updated TAWS data (as described above) would exceed the time that it would take the TAWS datacenter 112 to respond to the request for updated TAWS data.

Accordingly, to summarize, and in general terms, the systems and methods described herein enable a TAWS system 102 to receive dynamically (e.g., real time) updated TAWS data (e.g., airport obstacle as well as other data, such as runways data, and the like (as described herein) in response to the request made by the TAWS system 102 via a wireless connection (e.g., a SATCOM, VHF, HF, WIFI, GATELINK WIFI connection) to a ground service provider such as the TAWS datacenter 112 using an existing (e.g., ARINC 615-A dataload protocol for avionics). The request coming from the TAWS sytem 102 would not be easily hacked and would be very light in data bandwith as well as the resulting data uploaded into the TAWS datacenter 112 as this would only correspond to the current and/or next needed TAWS data (e.g., airport obstacle information), as reported and/or received from an airport identification provided by an onboard flight management system. The systems and methods described herein therefore can provide permanent, up to date, obstacle (and other, in various embodiments) data in every TAWS system 102 connected to the TAWS datacenter 112 without manpower effort from airline personnel.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for updating an onboard a-terrain awareness and warning system (TAWS) database of an aircraft, the system comprising:
 a first wireless communications device that is onboard the aircraft and that is configured to transfer data with a remote TAWS database that is remote from the aircraft; and
 a TAWS system onboard the aircraft, the TAWS system communicatively coupled to the first wireless communications device, the TAWS system including the onboard TAWS database, and configured to:
  (a) receive information relating to a flight path of the aircraft from an onboard flight management system,
  (b) request, by way of the first wireless communications device communicating by way of an avionics data transfer protocol, an update of TAWS data in the onboard TAWS database and associated with the flight path of the aircraft, and
  (c) receive and accept, from the remote TAWS database by way of the first wireless communications device and by way of the avionics data transfer protocol and in response to the request, the update to the TAWS data for the flight path of the aircraft.

2. The system of claim 1, the TAWS system further configured to update the TAWS data based upon the received update.

3. The system of claim 1, the TAWS system further configured to request the update to the TAWS data by way of at least one of a:
 satellite wireless communications device, a VHF wireless communications device, an HF wireless communications device, or a GATELINK wireless communications device.

4. The system of claim 1, the TAWS system further configured to receive the update to the TAWS data by way of at least one of a:
 satellite wireless communications device, a VHF wireless communications device, an HF wireless communications device, or a GATELINK wireless communications device.

5. The system of claim 1, wherein the TAWS system is configured to receive destination information relating to the flight path of the aircraft from the onboard flight management system; and
 wherein the TAWS system is further configured to request the update to the TAWS data based upon the destination information.

6. The system of claim 1, the TAWS system further configured to request at least one update to the TAWS data database at least one of: during a flight of an aircraft or while the aircraft is on the ground.

7. The system of claim 1, the TAWS system further configured to periodically request updates to the TAWS data at least one of: during a flight of an aircraft or while the aircraft is on the ground.

8. The system of claim 1, the TAWS system rejecting an update to the TAWS data that is not received in response to the request for the update.

9. A method for updating an onboard terrain awareness and warning system (TAWS) database of an aircraft, the method comprising:
 receiving information relating to a flight path of the aircraft from an onboard flight management system,
 wirelessly requesting, by way of a first wireless communications device communicating by way of an avionics data transfer protocol, an update of TAWS data in the onboard TAWS database and associated with the flight path of the aircraft, and
 wirelessly receiving and accepting, from a remote TAWS database by way of the first wireless communications device and by way of the avionics data transfer protocol and in response to the requesting, the update to the TAWS data for the flight path of the aircraft.

10. The method of claim 9, further comprising updating, by the TAWS system, the TAWS data based upon the received update.

11. The method of claim 9, further comprising requesting, by the TAWS system, the update to the TAWS data by way of at least one of a: satellite communications link, a VHF wireless communications link, an HF wireless communications link, or a GATELINK wireless communications link.

12. The method of claim 9, further comprising receiving, by the TAWS system, the update to the TAWS data by way of at least one of a: satellite communications link, a VHF wireless communications link, an HF wireless communications link, or a GATELINK wireless communications link.

13. The method of claim 9, wherein receiving information relating to the flight path includes receiving destination information relating to the flight path of the aircraft from the onboard flight management system; and wherein wirelessly requesting the update includes wirelessly requesting, by the TAWS system, the update to the TAWS data based upon the destination information.

14. A system for updating an onboard terrain awareness and warning system (TAWS) database, the system comprising:

a TAWS system onboard the aircraft, the TAWS system including the onboard TAWS database, the TAWS system configured to:
(a) receive information relating to a flight path of the aircraft from an onboard flight management system,
(b) periodically request an update to TAWS data in the TAWS database associated with the flight path of the aircraft by way of an aircraft wireless communications device,
(c) periodically receive, from a remote TAWS database in response to each periodic request, an update to the TAWS data in the onboard TAWS database by way of the aircraft wireless communications device, and
(d) periodically update, during the course of a flight of the aircraft, the TAWS data with the received update.

* * * * *

UNITED STATES PATENT AND TRADEMARK OFFICE
CERTIFICATE OF CORRECTION

PATENT NO. : 9,753,969 B2
APPLICATION NO. : 14/559342
DATED : September 5, 2017
INVENTOR(S) : Christophe Ceccom Page 1 of 1

It is certified that error appears in the above-identified patent and that said Letters Patent is hereby corrected as shown below:

In the Claims

Column 7, Line 47 (Claim 1), delete "a-"

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*